United States Patent [19]

Dickau et al.

[11] Patent Number: 4,930,669

[45] Date of Patent: Jun. 5, 1990

[54] SEALLESS MODULAR DISPENSER

[75] Inventors: Ewald F. Dickau, Glastonbury; John P. Breault, New Britain, both of Conn.

[73] Assignee: Loctite Corporation, Newington, Conn.

[21] Appl. No.: 176,877

[22] Filed: Apr. 4, 1988

Related U.S. Application Data

[63] Continuation-in-part of Ser. No. 57,614, Jun. 3, 1987, abandoned.

[51] Int. Cl.[5] .............................................. G01F 11/06

[52] U.S. Cl. ...................................... 222/309; 222/518

[58] Field of Search ............... 222/491, 559, 495, 496, 222/309, 380, 372, 504, 334, 567, 518; 403/362; 92/104, 96

[56] References Cited

U.S. PATENT DOCUMENTS

| | | | |
|---|---|---|---|
| 2,111,168 | 3/1938 | Chansor | 92/104 |
| 3,355,112 | 11/1967 | Shaffer et al. | 222/504 |
| 3,463,363 | 8/1969 | Zelna | 222/504 |
| 4,180,239 | 12/1979 | Valukis | 251/60 |
| 4,347,806 | 9/1982 | Argazzi | 118/710 |
| 4,394,945 | 7/1983 | Taylor, Jr. | 222/571 |
| 4,678,100 | 7/1987 | Gelinas | 222/52 |
| 4,756,639 | 7/1988 | Hoshino | 403/362 |

OTHER PUBLICATIONS

"Operating Instructions-725D Diaphragm Valve", 16 pages Copyrighted 1983 by Electron Fushion Devices, Inc.

*Primary Examiner*—Robert J. Oberleitner
*Assistant Examiner*—Mark T. Le
*Attorney, Agent, or Firm*—Edward K. Welch, II; Eugene F. Miller

[57] ABSTRACT

Modular apparatus for dispensing precise quantities of a fluid product including a dispensing unit and an actuator unit. A housing of the dispensing unit defines a reservoir which contains the product under pressure. Within the housing is a ball-type valve mechanism. A deformable diaphragm isolates the reservoir from the mechanism which actuates the valve to prevent undesirable entry of the product. The diaphragm may be of a number of shapes, depending upon the length of the stroke desired for the ball mechanism. The dispensing unit is readily removable from the actuator unit and can be readily replaced with another dispensing unit. Different nozzle sizes can also be accommodated. The extent of the valve opening is adjustable in discrete increments.

22 Claims, 7 Drawing Sheets

FIG. 7
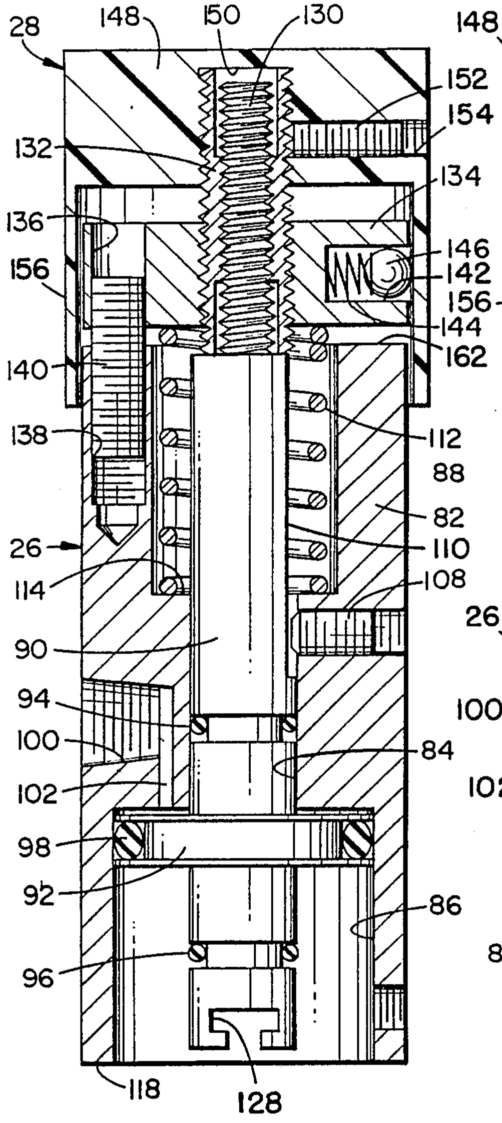
FIG. 8
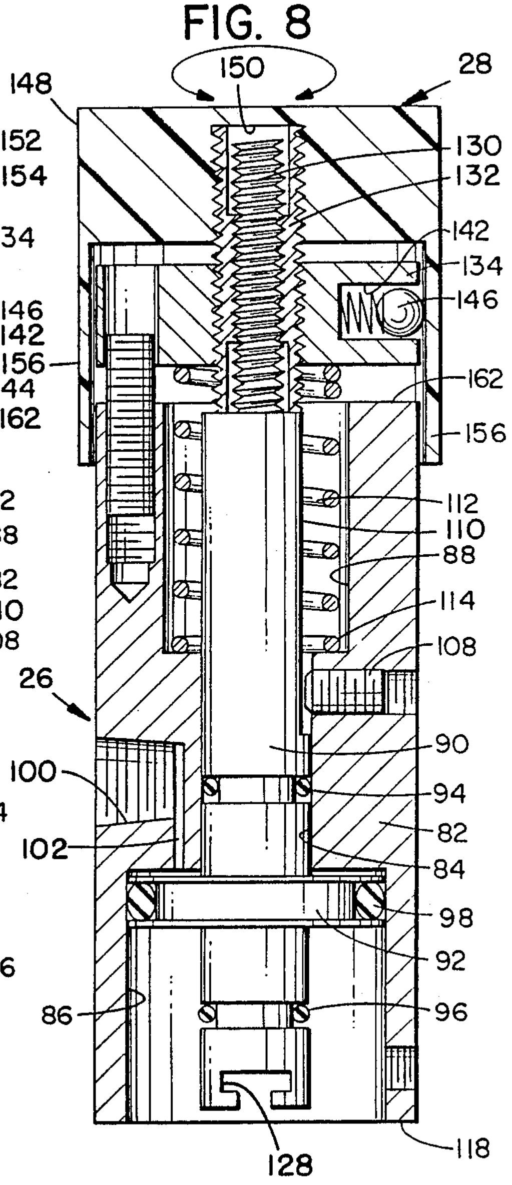
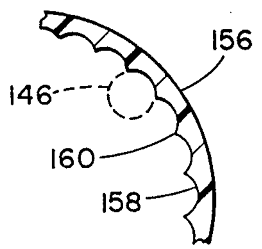
FIG. 10

SEALLESS MODULAR DISPENSER

This is a continuation in part of application of Ewald Dickau, Ser. No. 57,614 filed June 3, 1987 now abandoned entitled Sealless Dispensing Mechanism.

BACKGROUND OF THE INVENTION

I. Field of the Invention

The present invention relates generally to fluid dispensing mechanisms and, more particularly, to an improved modular dispenser system of simplified construction in which the dispenser module does not require seals, particularly sliding seals, or springs for its operation, yet applies precisely controlled quantities of the fluid to a receiving surface II. Description of the Prior Art There are a number of known designs for dispensing fluids such as adhesives, sealants, and the like, at accurately controlled flow rates, in accurate quantities, and for accurate placement on a receiving surface.

In one instance, a spring biased piston is pneumatically operated to open and close a valve, as needed, to control the flow of fluid to be dispensed from an outlet nozzle. The piston is provided with seals to prevent flow of the fluid in directions other than through the valve and these seals are subject to deterioration and wear, particularly when the fluid being dispensed is heated.

In another known dispenser design, a diaphragm is pneumatically operable to allow or interrupt flow of the fluid to a dispensing nozzle. The diaphragm can be moved by an actuating rod between a bowed position enabling flow to occur between inlet and outlet conduits and a planar position interrupting such flow. Again, proper sealing of the valve is a continuing problem. Specifically, it has not been possible heretofore to adequately seal the unit to prevent flow of the fluid into the actuating mechanism regardless of the type or number of seals being employed by the mechanism.

Another type of dispenser utilizes a positive displacement type of valve in which a quantity of the fluid is admitted into a chamber whereupon a piston then forces that quantity out through the dispensing outlet or nozzle. Again, in this instance, seals are necessary components of the mechanism and are not totally effective in satisfying their intended purpose.

In each of the foregoing instances, loss of the fluid that does not issue from the outlet nozzle but finds its way instead into other cavities of the dispensing mechanism is a the primary concern. This is particularly true when the fluid is a sealant or adhesive material, which subsequently accumulates, then hardens, and thereby has a detrimental effect on the operation of the dispensing mechanism, even to the point of rendering it inoperative.

Yet another known design of fluid dispenser utilizes a pinch valve according to which an actuator is selectively moved into or out of engagement with flexible tubing which extends from a source of supply to the dispensing head. While seals are not a particular problem with this design of dispenser, the length of the tubing necessary for this design is sufficiently long that it undesirably results in a delayed response time between the operation of the valve and the resultant flow of fluid being dispensed from the nozzle. This, in turn, causes inconsistent flow through the nozzle thereby reducing accuracy, namely, placement of a particular quantity of fluid at a particular location at a particular time.

A significant improvement in the state of the art occurred with the invention disclosed in the co-pending and commonly assigned application of E. Dickau, entitled "Sealless Dispensing Mechanism", Ser. No. 57,614 (now abandoned) filed June 3, 1987 which is hereby incorporated by reference in its entirety. That invention relates to a simplified fluid dispenser for dispensing precise quantities of fluid without requiring special seals or springs. It comprises a housing defining a fluid reservoir having an inlet for delivery of pressurized fluid to the reservoir, and including a valve seat defining an outlet for dispensing fluid from the reservoir. A deformable actuator mechanism overlies an open end of the housing opposite the outlet and normally biases a valve engageable with the valve seat to the closed position. When selectively deformed, the actuator is effective to move the valve to the open position to dispense a quantity of the fluid from the reservoir. When released, the actuator returns to its normal condition, returning the valve to the closed position. It is able to dispense fluids having an extremely broad range of viscosities, namely, from one centipoise to a value substantially in excess of one million centipoises.

Furthermore, the dispenser of that invention can be turned on and off instantaneously, that is, starting and stopping a flow of fluid occurs at substantially the same time as operation of the valve actuator. Additionally, fluid does not drip from the outlet nozzle when the valve of the novel dispenser is closed but rather, because of its unique design, the fluid is drawn back thereby avoiding drippage of the fluid. Another significant feature of that invention resides in its construction and manner of operation according to which movement of an actuator used to operate the dispenser causes simultaneous and equal movement of the valve off its seat for dispensing the fluid. This feature allows the dispenser to operate at very high actuation speeds. In actual fact, the dispensing of the fluid is substantially simultaneous with the actuation of the valve.

The construction disclosed in the aforesaid patent application utilizes no internal seals, especially sliding seals which are particularly susceptible to wear. As a result, the operation of that invention is not hindered by seals which are particularly susceptible to becoming inoperative by being caked or up with dried or partially dried sealant or adhesive material which are commonly dispensed products.

SUMMARY OF THE INVENTION

The present invention represents further improvements over the superior dispensing mechanism just described and results from continued developed of the concepts disclosed in that aforesaid patent application. A primary feature of the present invention resides in its modular design according to which a self contained actuating unit can be joined with a dispensing unit by way of a quick disconnect construction. According to the invention, both the actuating unit and the dispensing unit may be constructed in a variety of sizes, each size of an actuating unit being interchangeable with each size of a dispensing unit. A quick disconnect locking mechanism is utilized according to which any actuating unit can be rapidly and easily connected to, or disconnected from, an associated dispensing unit. In the same manner, any one of a variety of sizes of dispensing nozzles can also be attached to any of the dispensing units.

In the present invention, a diaphragm, which may be any one of a variety of shapes and constructions, serves to separate the actuating unit from the dispensing unit when the two are joined together. The diaphragm replaces dynamic or shaft seals which were utilized in dispensers known to the prior art. Since the diaphragm does not slide, its operation does not create heat which would have the effect of undesirably promoting curing in the instance in which the product being dispensed is a heat curable sealant or adhesive. Also, because there is no sliding action, wear is minimized and frictional losses can be discounted.

The dispenser of the invention is able to dispense fluid products of a broad range of viscosities, from at least one to at least one million centipoises. This ability is achieved by means of a curing resistant design according to which the fluid reservoir has a relatively large diameter while the stem for actuating the valve has a relatively small diameter. Additionally, the preferable use of a spherical gate member, or check ball, in combination with a conical valve seat results in a line, rather than area, contact between the valve elements, thereby effectively guarding against bonding of the mating surfaces and undesirably causing the valve to be sealed in the closed position.

Another feature of the invention resides in its ability to accurately dispense discrete quantities of a fluid product enabling its use for statistical process control applications. The invention also has the capability of controlling, so as to optimize, suck-back. That is, at the end of a period of dispensing the fluid product, the invention operates to prevent stringing and dripping of the fluid product without undesirably drawing back air into the fluid product yet to be dispensed.

Still another particularly noteworthy feature of the invention resides in the flow adjustment mechanism which enables the operator, with the turn of a dial which is operable in a series of discrete increments, to either increase or decrease the flow rate of product being dispensed. Indeed, the novel dispenser is adjustable so that it can dispense either a drop or a bead. This flow adjustment capability, together with the features of instantaneous operation, which was previously mentioned, and its ability to be miniaturized, make the dispenser of the invention particularly attractive for use in robotized machinery. Such applications also benefit from the feature of modularity by which different size combinations of components, namely, actuating units, dispensing units, and dispensing needles can be utilized, then easily and rapidly changed, as desired.

The invention thereby enables the use of a valve mechanism which is tailored to a specific application or for the dispensing of a particular fluid product. For example, in a high speed operation which generates significant amounts of heat, or in a high temperature environment, it may be desirable to use ceramics or other materials which have a superior heat absorption capability. On the other hand, inexpensive plastic materials can be used for dispensing fluid products which have a very slow reaction time or which are substantially non reactive. Metals such as 316 stainless steel may be selected for certain fluid products which are low or moderately active where the use is in a medical, explosive, or clean-room environment. Fluorinated hydrocarbon polymer, for example, TEFLON brand plastic, is a preferred material for those components exposed to the fluid product when the fluid product is highly reactive and when dispensing speeds are moderately high.

Other and further features, objects, advantages, and benefits of the invention will become apparent from the following description taken in conjunction with the following drawings. It is to be understood that both the foregoing general description and the following detailed description are exemplary and explanatory but are not restrictive of the invention. The accompanying drawings, which are incorporated in and constitute a part of this invention, illustrate some of the embodiments of the invention and, together with the description, serve to explain the principles of the invention in general terms. Like numerals refer to like parts throughout.

BRIEF DESCRIPTION OF THE DRAWINGS

FIGS. 7 and 8 are elevation views, in section, illustrating the actuator and adjustment units of FIG. 6 in the assembled condition and showing, respectively, two operational positions of the adjustment unit;

FIG. 10 is a detail cross section view taken generally along line 10—10 in FIG. 9;

DESCRIPTION OF THE PREFERRED EMBODIMENTS

Figure 1:
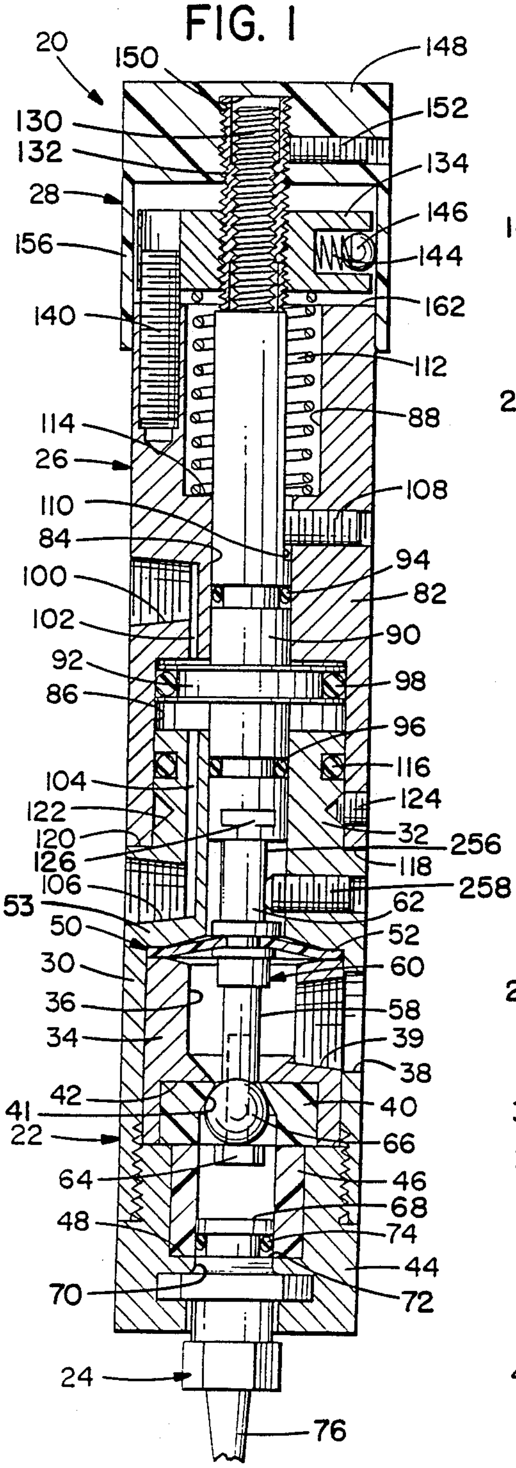
FIG. 1 is a front elevation view, largely cut away and in section, of modular dispensing apparatus embodying the invention.
Figure 2:
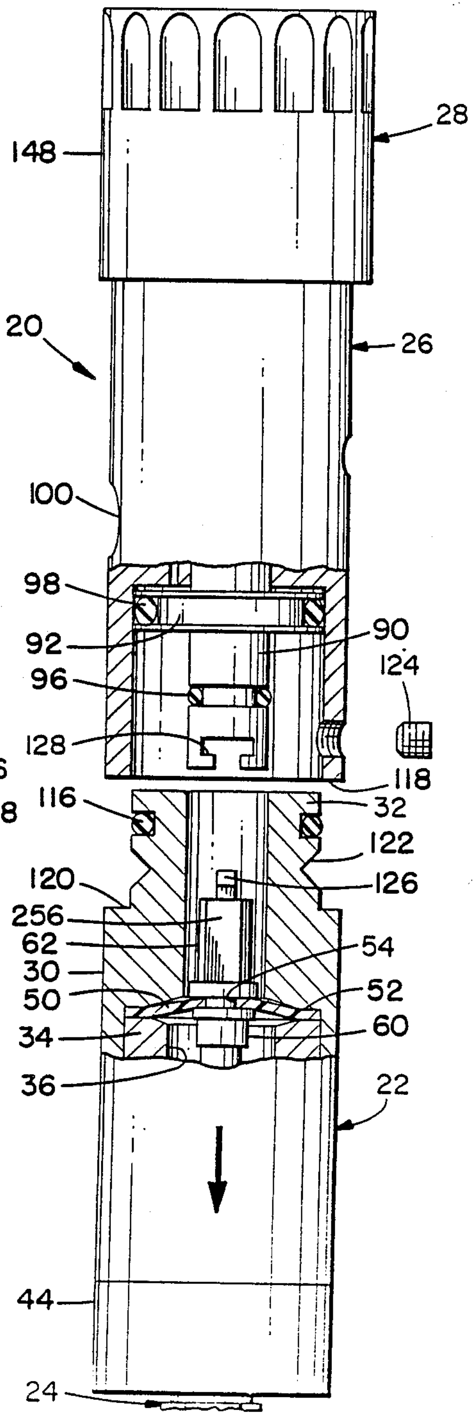
FIG. 2 is a front elevation view, generally similar to FIG. 1, of the apparatus partly exploded and partly cut away and in section, the lower part being rotated by 90° about the longitudinal axis from the position illustrated in FIG. 1.

Turn now to the drawings and, initially, to FIGS. 1 and 2, which illustrate modular dispensing apparatus 20 embodying the present invention. The apparatus 20 is intended to have the capability of dispensing a broad range of fluid products, many of which are highly injurious to materials and including cyanoacrylates and anaerobic adhesives. The apparatus 20 comprises a dispensing unit 22, a nozzle unit 24, an actuator unit 26, and an adjustment unit 28. Each of these units will be described in detail together with an explanation of their interrelationship.

The description will begin with the dispensing unit 22 which includes a cylindrical housing 30 with an end member 32 of reduced diameter. While the housing 30 is described and illustrated as being cylindrical and thereby conforms with all of the other units illustrated in FIGS. 1 and 2, such shape, while preferred, is not intended to be limiting of the invention. An insert 34 is fittingly receivable within the housing 30. The insert 34 defines a reservoir 36 capable of receiving pressurized product from a distant source (not shown) via an inlet 38 in the housing 30 and an aligned inlet 39 in the insert. It will be appreciated that the housing 30 and insert 34 may be of one piece construction and that they are only described as being separate for ease of fabrication.

With continued reference to FIGS. 1 and 2, valve seat 40 is fittingly received in a counterbore 42 formed at an end of the insert 34. The valve seat 40 which is preferably formed with a conical shaped closure surface 41 is composed of a suitable material compatible with a fluid product to be dispensed, the material including but not limited to, DELRIN brand plastic, polyethylene, polypropylene, nylon, polyester, metals including stainless steel and preferably 316 stainless steel, ceramics, and most preferably fluorinated hydrocarbon polymer, for example, TEFLON brand plastic.

The end of the housing 30 opposite the end member 32 is internally threaded so as to receive a cap member 44. A tubular retainer 46 is fittingly received in a counterbore 48 formed within the cap member 44. When the cap member is tightened onto the housing 30, the retainer 46 bears against the valve seat 40 and, in turn, against the insert 34.

A deformable diaphragm 50 which may be composed of any suitable deformable material compatible with the fluid product being dispensed extends transversely of a longitudinal axis of the housing 30. Such suitable materials may be any of those recited above with respect to the valve seat, with the exception of ceramics. The outer peripheral regions 52 of the diaphragm 50 (see FIG. 3) are captured between the insert 34 and a shoulder 53 (FIGS. 4 and 5) of the housing 30 when the cap member 44 is fully tightened onto the housing. As seen most clearly in FIG. 3, the diaphragm 50 has a central aperture 54 which allows it to freely receive a threaded stud 56 extending from a distal portion 58 of an elongated stem member 60 (FIGS. 4 and 5).

A proximal extension 62 (FIGS. 1, 2, 4, and 5) of the stem member 60 is threadedly engaged with the stud 56 and when tightened down onto the diaphragm 50, the stem member 60 and the diaphragm 50 operate in a unitary manner. The proximal extension 62 is provided with a longitudinal flat 256 (FIGS. 2 and 3) which serves as a keyway and prevents rotation of the extension when the flat 256 is engaged by a set screw 258 threaded with housing 30. A distal end of the distal portion 58 has a longitudinally extending threaded bore therein to receive a fastener 64 (see especially FIGS. 4 and 5). The fastener is slidably received through a diametrically extending bore in a ball 66 which may be composed of any suitable material compatible with the fluid product being dispensed. Such a suitable material may be any of those materials of which the valve seat 40 may be composed. When the fastener 64 is tightened onto the distal portion 58 of the stem member 60, the ball is integral, and operates in unison, with the stem member and its associated diaphragm 50. It will be appreciated that the invention is not to be restricted to a valve gate in the form of the ball 66 but that it may be of any suitable shape that results in a proper closure of the opening between the reservoir 36 and the nozzle unit 24. The ball 66 is preferred because it results in a line contact, and not an area contact, between the ball and the closure surface 41. Other suitable shapes of valve gates, however, which may not be sperical, such as indicated at 66A in FIG. 4A, may also be effectively used.

Figure 3:
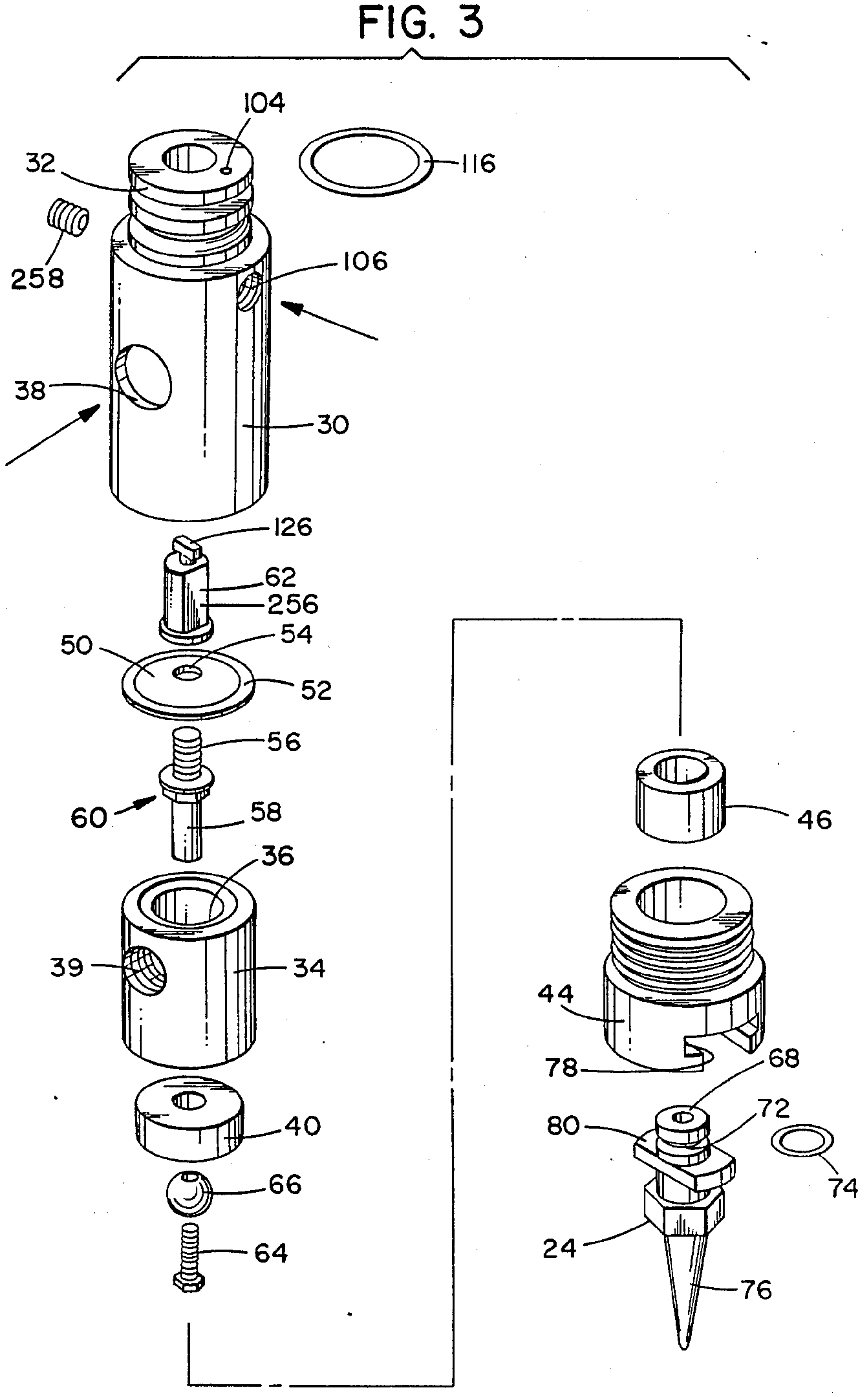
FIG. 3 is an exploded view of dispensing and nozzle units comprising part of the apparatus illustrated in FIG. 1.
Figure 4:
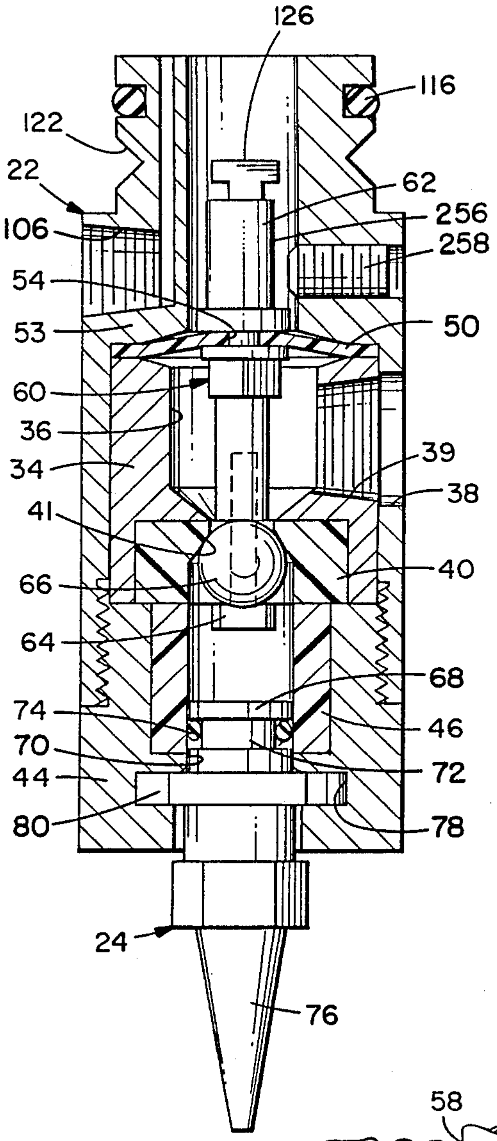
FIGS. 4 and 5 are elevation views, largely cut away and in section, illustrating the dispensing and nozzle units of FIG. 3 in the assembled condition and showing, respectively, two operational positions thereof.
Figure 5:
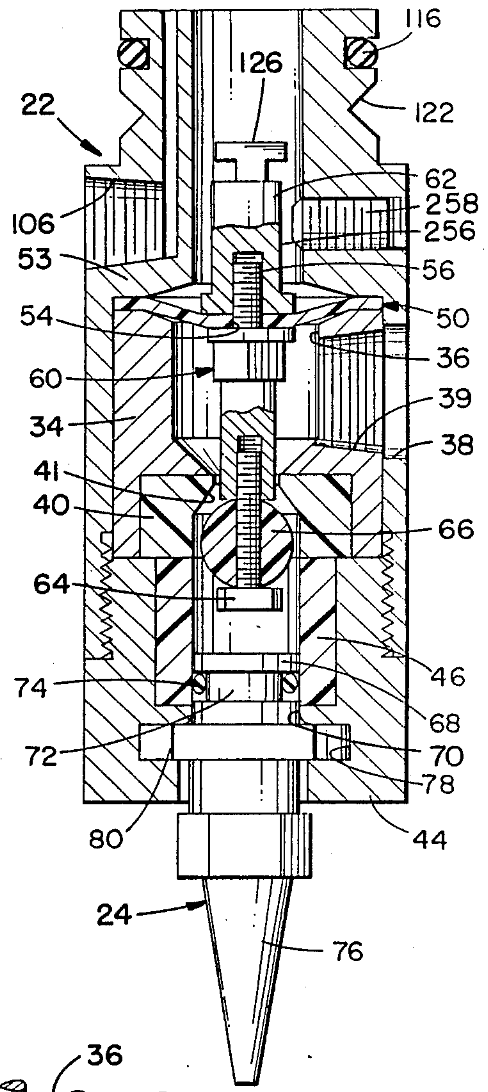
Figure 4A:
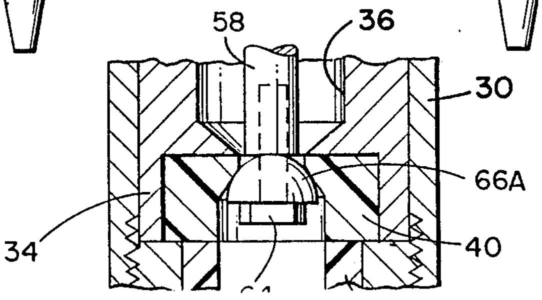
FIG. 4A is a detail elevation view, partly in section, of another embodiment of parts illustrated in FIGS. 4 and 5.

Viewing especially FIGS. 3, 4, and 5, the nozzle unit 24 includes a mounting end 68 which extends through a longitudinal bore 70 formed in the cap member 44, then into the interior of the retainer 46. An annular groove 72 formed a short distance away from an innermost end of the nozzle unit 24 serves to receive an 0-ring seal 74 which assures passage of product, in a manner to be explained, through a hollow needle member 76. The cap member 44 is formed with a diametrically extending slot 78 whose purpose is to receivably engage oppositely extending bayonet type extensions 80 integral with the nozzle unit 24. By reason of this construction, the dispensing unit 22 can accommodate, one at a time, a variety of sizes of nozzle units 24. A nozzle unit can be removed by twisting it slightly around its longitudinal axis, then pulling it outward of the bore 70. A new or different nozzle unit 24 can then be attached by reversing the operation just described.

Figure 6:
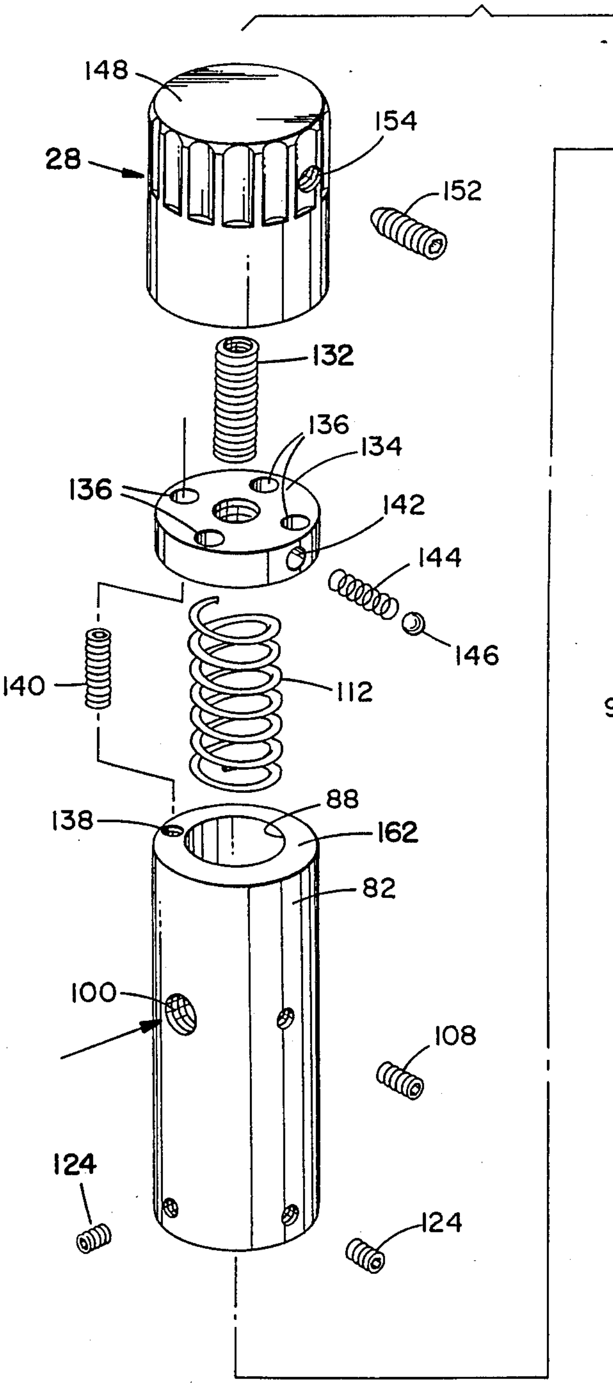
FIG. 6 is an exploded view of actuator and adjustment units comprising part of the apparatus illustrated in FIG. 1.

The actuator unit 26, also as seen in FIGS. 1 and 2, and with more detail in FIGS. 6-8, includes an elongated cylinder 82 with a longitudinally extending central bore 84 formed in its intermediate regions, a distal counterbore 86, and a proximal counterbore 88. Both counterbores 86 and 88 communicate with and are axially aligned relative to the central bore 84. An actuator shaft 90 is slidingly received in the central bore 84 and is integral with a piston 92 which is disposed within the counterbore 86. The piston 92, and with it actuator shaft 90, is reciprocable along an actuating axis which is the longitudinal axis of the cylinder 82. The piston 92 may be fluid operated, preferably pneumatic, although other fluids, including liquids, could be utilized. Indeed, it will be appreciated that the actuator unit 26 could be of a completely different type, for example, an electrically operated solenoid, or a mechanical cam. Also, operation of the actuator unit 26 may be under the control of an appropriate computer (not shown). However, in the instance of the fluid operated actuator unit 26, 0-ring seals 94 and 96 encircle the actuator shaft 90 at locations spaced in opposite directions from the piston 92. The piston 92 itself is also provided with a suitable 0-ring seal 98.

Thus, viewing FIG. 1, in order to move the piston 92 downwardly, pressurized actuating fluid is introduced to an inlet 100 whereupon it is caused to flow via a conduit 102 into the counterbore 86 above the piston. Any actuating fluid within the counterbore 86 beneath the piston 92 is then exhausted via a conduit 104 within the end member 32 and an outlet 106 with which it communicates. The actuator shaft 90 is prevented from rotating by means of a set screw 108 threadedly engaged with the cylinder 82 and radially disposed therein having an extremity which is positioned proximate to a longitudinal flat 110 (FIG. 6) formed in the shaft which serves as a keyway. A compression spring 112 is received in the counterbore 88 and one end rests on a supporting surface 114 thereof. In a manner which will be described subsequently, the compression spring 112 serves, redundantly, to retain the piston 92 in the retracted position illustrated in FIG. 1 when it is in the inactive condition. That is, air or other actuating fluid is normally used to move the piston 92 to the inactive position, but the spring 112 is an added expedient for doing so in the event of a loss of actuating fluid.

In a manner which will now be described, the piston 92 serves to operate the valve mechanism as most specifically represented by the ball 66 operating in conjunction with the valve seat 40. With continuing reference to FIG. 1 the end member 32 of the dispensing unit 22 is slidably received within the distal counterbore 86 of the actuating unit 26. An 0-ring seal 116 suitably encircles the end member 32 short of its proximal end to assure a sealing relationship between the cylinder 82 and the end member 32. When an extreme distal rim 118 of the cylinder 82 firmly engages a shoulder 120 of the housing 30, an annular groove 122 formed in the outer surface of the end member 32 is aligned with a plurality of circumferentially spaced set screws 124 threadedly engaged with the cylinder 82 and extending radially therethrough. By reason of the construction just described, it will be appreciated that the dispensing unit 22 can be selectively attached to or removed from the actuator unit 26 and, further, that when the respective units are so joined, they can be prevented from separation by tightening the set screws 124 into engagement with the annular groove 122.

It is also noted that the extreme end of the extension 62 is formed with a male T-connector 126 (FIG. 3) which is engageable with a similarly formed female slot 128 (FIG. 6) in the distal end of the shaft 90. As the dispensing unit 22 is inserted into the actuator unit 26, the former is aligned so that the T-connector 126 is properly received by the slot 128. Thereupon, the dispensing unit 22 is rotated 90° so that the T-connector 126 is properly oriented to prevent withdrawal of the stem member 60 from the actuator shaft 90. When this occurs, the stem member and the shaft are operable as a unit when they are moved along a longitudinal axis of the apparatus 20. Customarily, the set screws 124 would not be adjusted to engage the annular groove 122 until the T-connector 126 had been fully engaged with the slot 128.

With reference now particularly to FIGS. 6, 7, and 8, the adjustment unit 28 will now be described. The adjustment unit 28 serves to selectively adjust operation of the piston 92 so that it moves the ball 66 off the seat 40 between any one of a plurality of open positions and the closed position. This concept will be explained in detail as the description proceeds. As seen particularly well in FIGS. 7 and 8, a threaded shank 130 is integral with and extends from a proximal end of the actuator shaft 90, that is, from an end distant from the piston 92. An internally threaded tubular stud 132 is threadedly engaged with the threaded shank 130 The stud 132 is also externally threaded, the external threads being coarser than the internal threads. A stroke adjuster nut 134 is threadedly received on the stud 132 and is keyed to the cylinder 82 for non-rotational, axial movement along the longitudinal or actuating axis of the apparatus 20.

This key construction will now be described. As seen particularly well in FIG. 6, the stroke adjuster nut 134 is formed with four bores 136 which are parallel to a longitudinal axis of the cylinder 82 and equally spaced circumferentially of the nut 134. The cylinder 82 is formed with a threaded bore 138 adapted to receive a threaded stud 140. The axis of the bore 138 is at the same radial distance from the longitudinal axis of the cylinder 82 as each of the bores 136. In any event, the stroke adjuster nut 134 is properly positioned on the stud 132. Then one of the holes 136 is aligned with the threaded bore 138, whereupon the stud 140 is received through the bore 136 and threadedly engaged with the bore 138. In this manner, the nut 134 is held against rotation relative to the cylinder 82, although it has freedom of axial movement relative to the cylinder 82.

The nut 134 is also formed with a radially directed bore 142 (FIGS. 6, 7, and 8) which, together with a compression spring 144 and a ball 146 having diameter just slightly less than the bore 142, operates as a detent in a manner which will be described shortly. With the spring 144 and the ball 146 held within the radial bore 142, a crown member 148 is threadedly engaged with the stud 132. The stud extends all the way to the bottom of a threaded bore 150 of the crown member 148. A set screw 152 is threadedly engaged with a radially directed bore 154 in the crown member, then advanced, until it engages the stud 132. With the set screw 152 thereby engaging the stud 32, the crown member 148 and the stud 132 operate as a unit.

Figure 9:
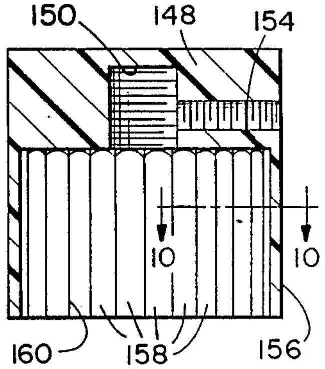
FIG. 9 is an elevational cross section view of one component illustrated in FIGS. 6–8.

Integral with the crown member 148 is an annular skirt 156 (FIGS. 7 and 8) which overlies the outer surface of the cylinder 82. As seen particularly well in FIGS. 9 and 10, the inner peripheral surface of the skirt 156 is formed with a plurality of parallel, side-by-side, longitudinally extending grooves 158, each groove having approximately the same radius of curvature as the ball 146. Indeed, the ball 146 engages one of the grooves 158 at a time. By reason of the resiliency of the spring 144, the crown member 148 can be rotated about its longitudinal axis, causing the ball 146 to ride over a ridge 160 intermediate adjoining grooves 158 until it comes to rest in the next groove, and so forth. There is a fixed relationship between the rotation of the crown member about the actuating axis and movement of the adjuster nut 134 along the actuating axis. The apparatus 20 might be designed, for example, such that the adjuster nut 134 advances toward or retracts from a terminal surface 162 of the cylinder 82 at the rate of 1/1000th of an inch per click, that is, movement of the ball 146 from one groove 158 to its adjoining groove.

Although FIGS. 1–5 have consistently illustrated one form and construction of the diaphragm 50, it need not be so limited but may be of a variety of shapes and constructions. However, in each instance the outer peripheral region of the diaphragm is held fixed while the central region is movable in a direction transverse to a general plane of the diaphragm.

Figure 11:
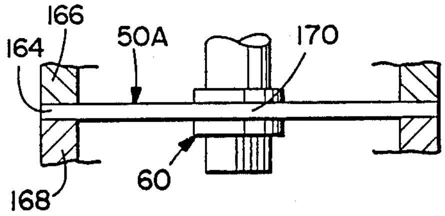
FIGS. 11–16 are detail elevation views, partly in section, illustrating other embodiments of a diaphram construction which can be utilized by the invention.
Figure 12:
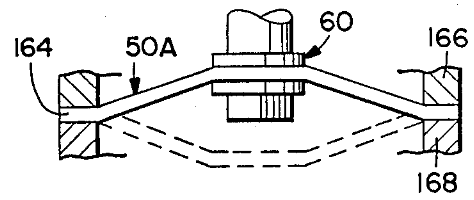

For example, in FIG. 11, a modified diaphragm 50A is illustrated having its outer peripheral region 164 firmly held between suitable retention members 166, 168. While the stem member 60 fixed to a central region 170 of the diaphragm 50A is free to move in a longitudinal direction, it is subject to the degree of elasticity present in the diaphragm in directions transverse to a plane of the diaphragm. Extreme positions of the diaphragm 50A are illustrated in FIG. 12.

Figure 13:
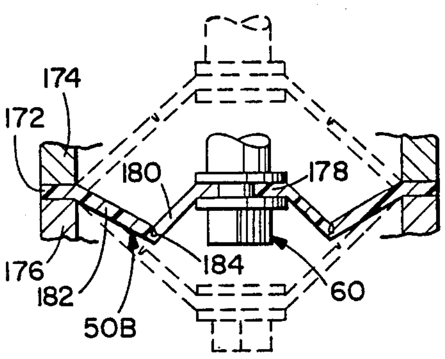
Figure 14:
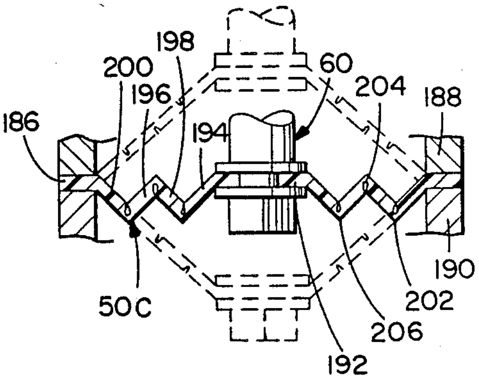

Greater transverse movement can be achieved with the constructions illustrated in FIGS. 13 and 14. With respect to FIG. 13, another modified diaphragm 50B has its outer peripheral region 172 fixedly held by retention members 174, 176 while its central region 178 is fixed to the stem member 60. The diaphragm 50B, which is illustrated in FIG. 13 in its relaxed condition, includes a first fold member 180 adjacent the central region 178 and a second fold member 182 adjacent the outer peripheral region 172. The fold members 180 and 182 intersect at an annular apex 184 which is of a living hinge construction. As seen in FIG. 13, the apex 184 lies out of the plane of the central region 178 and outer peripheral region 172 when the diaphragm 50B assumes its solid line position (FIG. 13) When the stem member 60 is moved along its longitudinal axis, it will be seen that the diaphragm can take either of the two extreme positions illustrated in FIG. 13 by means of dotted lines. It will be appreciated that the displacement from the norm obtainable with the diaphragm 50B is substantially greater than that obtainable with either the diaphragm 50 or 50A.

A variation on the construction of the diaphragm 50B is illustrated in FIG. 14 in which another modified diaphragm 50C is illustrated. In this instance, the diaphragm has an outer peripheral region 186 which is fixed between suitable retention members 188, 190 and a central region 192 which is fixed to the stem member 60. In this instance, a plurality of concentric fold members 194, 196 cooperate with a like plurality of fold members 198, 200. Each adjoining pair of fold members defines an annular apex 202, 204, and 206, respectively, each of which is a living hinge. Upon actuation of the stem member 60, the diaphragm 50C can be moved to the extreme positions indicated by dotted lines in FIG. 14 in which all of the fold members are movable toward a generally mutually coplanar relationship.

Figure 15:
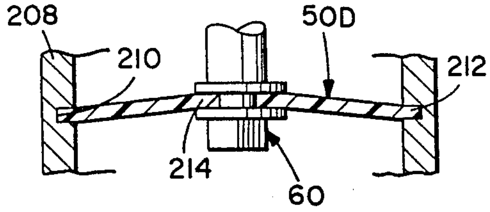

Still another construction is illustrated in FIG. 15 in which an outer cylindrical retention member 208 which may be a housing itself or an insert within that housing is formed with an internal annular slot 210 therein. The slot 210 is capable of receiving and holding an outer peripheral region 212 of another modified diaphragm 50D whose central region 214 is fixed to the stem member 60.

Figure 16:
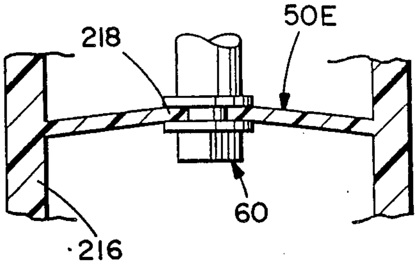

Yet another construction is illustrated in FIG. 16 in which an outer retainer 216 and a modified diaphragm 50E are integral. The components may be fabricated, for example, of an injection molded plastic material. An outer peripheral region of the diaphragm 50E, in this construction, is integral with the retainer 216 but, again, it has a central region 218 which is fixed to the stem member 60. As in the previously described constructions, the stem member is movable along its longitudinal axis within defined limits depending upon the degree of elasticity present in the diaphragm.

OPERATION

The operation of the modular dispensing apparatus 20 will now be described. The particular fluid to be dispensed, which may be, for example, a sealant or adhesive material in the form of a slurry, or otherwise, is introduced, under pressure, via inlets 38 and 39 so as to fill the reservoir 36. At an appropriate time, the actuator unit 26 is operated to dispense the product from the dispensing unit 22. Viewing FIG. this is achieved by introducing pressurized fluid, air for example, via the inlet 100 to the upper side of the piston 92. This moves the actuator shaft 90 downwardly and, with it, the stem member 60. This causes the diaphragm 50 to move from the position illustrated in FIG. 4 to that illustrated in FIG. 5 and, simultaneously, moves the ball 66 off the valve seat 40 as respectively seen in those those illustrations. Flow of the fluid product through the nozzle 24 thereupon commences. Subsequently, when it is desired to terminate the dispense operation, the foregoing procedure, is reversed in that air is introduced through the outlet 106 to the lower side of the piston 92 (FIG. and exhausted through the inlet 100. In this manner, the ball 66 is returned to the closure surface 41 and the flow of the fluid product ceases.

The movement of the piston 92 and of the actuator shaft 90 is against the bias of the spring 112. Furthermore, the stroke of the piston 92 is determined by the distance between the adjuster nut 134 and the terminal surface 162. FIG. 7 illustrates a positioning of the adjuster nut 134 relative to the terminal surface 162 which will permit only a relatively small stroke by the piston and FIG. 8 illustrates such a relative positioning as will permit a relatively long stroke for the piston.

Of course, it is the stroke of the piston 92, as permitted by the adjuster nut 134, which determines the extent of the opening of the valve, that is the movement of the ball 66 off the valve seat 40. The farther off the seat 40 the ball 66 moves, the greater is the flow rate permitted by the dispensing unit 22 up to the point at which the spacing between the ball and the closure surface 41 is equal to the spacing between the ball and the chamber downstream of the closure surface. The product then flows through the retainer 46, then through the needle member 76 of the nozzle unit 24 and onto a surface intended to receive the product. When it is intended to terminate the dispensing operation, pressurized air is introduced to the lower side of the piston 92 via the outlet 106 and air on the upper side of the piston 92 is exhausted through the inlet 100. The spring 112, which aids in this operation, serves primarily to close the valve in the event no pressurized air is available for the purpose.

It was explained above that an important feature of the dispenser 20 is its ability to provide a controlled suck-back of the fluid product at the end of a dispensing period. It will be appreciated that a dispensing period may end after laying either one drop or a continuous bead. The duration of opening of the valve is of no consequence with respect to suck-back. What is of importance is the ability of the dispenser to avoid stringing and dripping of the fluid product without undesirably drawing air into the fluid product within the reservoir 36. When the ball 66 is moved off the closure surface 41 by a distance substantially equal to the spacing between the ball and the outer wall of the chamber into which it advances, a maximum flow rate will have been achieved when a constant pressure is applied to the fluid product upstream thereof. That is, moving the ball 66 a farther distance away from the closure surface 41 will not thereafter have any effect on the flow rate.

However, this distance has a direct effect on the amount of suck-back applied to the fluid product upon return of the ball 66 into engagement with the closure surface 41. Upon retraction of the ball 66, a partial vacuum is created downstream therefrom and this suction serves to draw the fluid product from the nozzle 24 and back toward the reservoir 36. The amount of vacuum thus created is proportional to the distance which the ball 66 moves off the closure surface 41. If, for a particular fluid product, the ball is moved too far off the closure surface, air would be drawn into the fluid product and resulting air bubbles within the fluid product would have an undesirable affect on subsequent dispenses. Conversely, if movement of the ball 66 off the closure surface 41 were too small a distance, stringing and dripping of the fluid product from the nozzle 24 would not be prevented. Thus, suck-back is a function of the distance the ball 66 travels away from the closure surface 41 and also of the viscosity of the fluid product since air is more easily drawn into a fluid of low viscosity than one of high viscosity. By adjusting the distance which the ball 66 moves off the closure surface 41, the adjustment unit 28 serves to control the suck-back capability of the dispensing apparatus 20, in addition to controlling, in part, the flow through the nozzle, and this can be selected according to the particular fluid product being dispensed.

The apparatus 20 is of a modular design in that it permits various combinations of actuator units 26, diaphragms, dispensing units 22, and nozzle units 24. The dispenser of the invention is considered sealless because the dispensing unit 22 completely lacks the sliding seals of the type which have heretofore customarily been employed in fluid dispensing apparatus and which typically fail in their operation when the seals fail. In this instance, the diaphragm 50 is the sole component utilized to isolate the actuator unit 26 from the dispensing unit 22. While axial movement is permitted by reason of the deformability of the diaphragm, it is held fixed at both its interior locations and its outer peripheral locations to prevent any possibility of the product passing from the reservoir 36 into the mechanism of the actuator unit. Wear and frictional losses and loss of product are avoided by reason of this construction. Additionally, such construction allows for the changing of components without loss of fluid from the dispensing unit.

Figure 17:
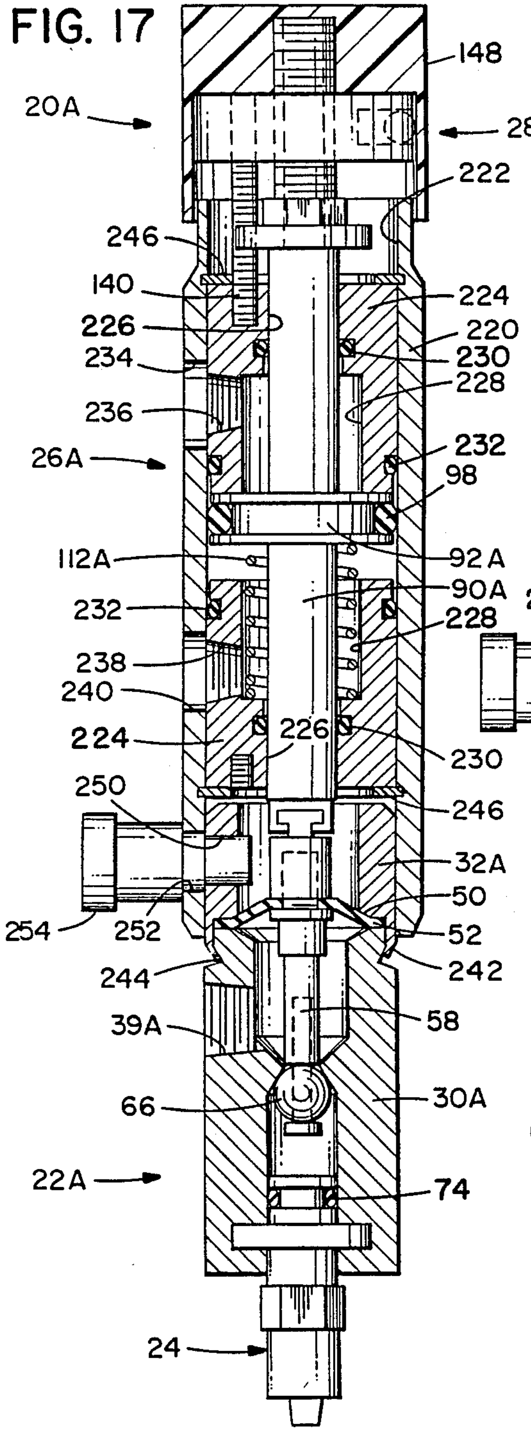
FIGS. 17 and 18 are front elevation views similar, respectively, to FIGS. 1 and 2, of another embodiment of the invention, the lower part of FIG. 18 being rotated by 90° about the longitudinal axis from the position illustrated in FIG. 17.
Figure 18:
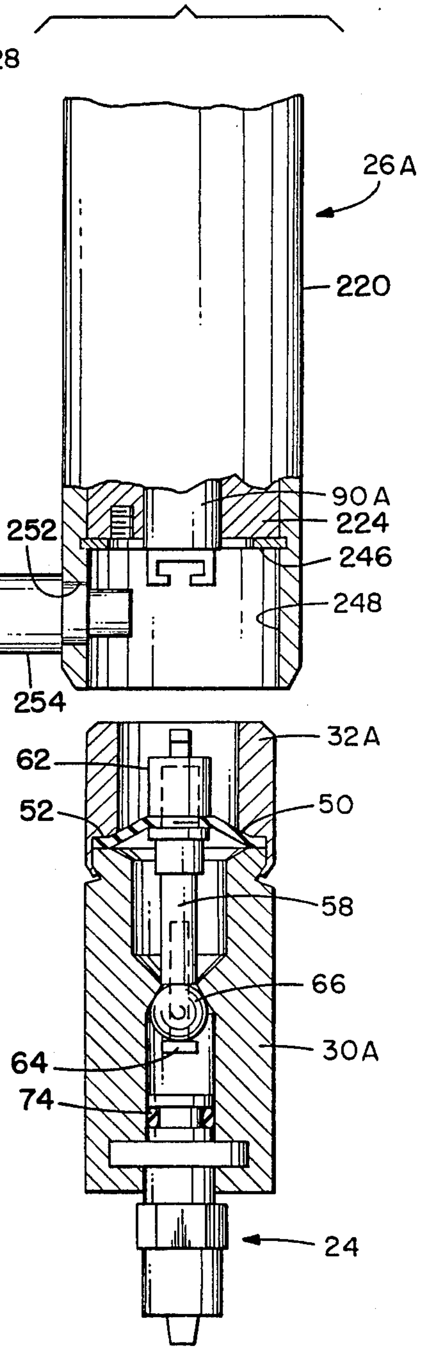

Another, and preferred, embodiment of the actuating unit will now be described with reference to FIGS. 17 and 18. In this regard, a modified actuator unit 26A includes an elongated outer sleeve 220 which defines a longitudinally extending bore 222 extending its full length. A pair of similar but oppositely disposed cylindrical support members 224 are fittingly received in the bore 222 at spaced locations. Each of the support members 224 has a longitudinally extending bore 226 which is coaxial with the longitudinal axis of the sleeve 222. Each support member 224 also has a counterbore 228. The space defined by the counterbore 228 in the lower support member 224 (FIG. 17) serves to receive a modified compression spring 112A which operates in substantially the same manner as the spring 112. A modified actuator shaft 90A is slidingly received in the bores 226 of the support members 224 and is integral with a modified piston 92A which is disposed within the bore 222. As in the previous embodiment, the piston 92A, and with it the actuator shaft 90A, is reciprocable along an actuating axis which is the longitudinal axis of the outer sleeve 220. In the same fashion, the piston 92A may be fluid operated, preferably pneumatic, and 0-ring seals 230 and 232, respectively, encircle the actuator shaft 90A and the support member 224 at locations spaced in opposite directions from the piston 92A. The piston 92A itself is also provided with a suitable 0-ring seal 98 as in the previous embodiment.

In this embodiment, in order to move the piston 92A downwardly (FIG. 17), pressurized actuating fluid is introduced to cooperating inlets 234, 236, respectively, in the outer sleeve 220 and in upper support member 224. Downward movement of the piston 92A causes actuating fluid to exhaust via outlets 238, 240, respectively, in the lower support member 224 and in the outer sleeve 220. As in the instance of the prior embodiment, downward movement of the piston 92A is accomplished against the bias of the spring 112A.

According to this embodiment, a modified dispensing unit 22A is also provided. In this instance, a modified end member 32A has a depending annular skirt 242 which is mechanically crimped onto a suitable annular surface 244 at an upper end of a modified cylindrical housing 30A. The outer peripheral regions 52 of the diaphragm 50 are thereby firmly fixed between the end member 32A and the housing 30A. A pair of retainer rings 246 prevent longitudinal movement of the support members 224 toward the ends of the sleeve 220 and, at the lower end thereof, define a reception cavity 248 (FIG. 18) for fitting reception of the end member 32A. When a pair of mating apertures 250 and 252 in the end member 32A and sleeve 220 are appropriately aligned, a suitable locking member 254 which may utilize, for example, a ball and detent locking mechanism, is then inserted through the apertures to releasably mount the dispensing unit 22A onto the actuator unit 26A.

A primary feature of this modified construction is the fact that the inlets and outlets for the actuating fluid are completely within the actuator unit 26A and are not related in any way to the dispensing unit 22A. As a result, the dispensing unit 22A may be detached from or attached to the actuator unit 26A without the necessity of first disconnecting the actuator unit from the source of actuating fluid. Indeed, the source of actuating fluid may remain connected to the actuator unit regardless of whether the dispensing unit 22A is mounted thereon.

While it is acknowledged that there are other dynamic seals in the apparatus 20, for example, 0-ring seals 94, 96, 98, and 116, these are seals within the actuator unit 26 and not directly involved with, or concerned with, the product being dispensed. The 0-ring seal 74 is associated with the nozzle unit 24 and, therefore, also not directly with the dispensing unit 22. In any event, its condition is easily observable and it can be readily removed along with the nozzle unit and replaced if it becomes defective. Furthermore, it is not a dynamic, or sliding type seal, which is the type of seal with which the invention is concerned and serves to replace.

Although preferred embodiments of the invention have been disclosed in detail, it should be understood by those skilled in the art that various modifications may be made to the illustrated embodiments without departing from the spirit and scope thereof as described in the specification and defined in the appended claims.

What is claimed is:

1. Apparatus for dispensing precise quantities of a fluid product comprising:
   - dispensing means for dispensing the fluid product when in any one of a plurality of open configurations and for stopping or prohibiting the dispensing thereof when in a closed configuration;
   - actuator means for effecting said dispensing means between the open and closed configurations comprising an operative mechanism and an actuator body; and
   - adjustment means for selectively adjusting operation of said actuator means enabling it to effect said dispensing means between any one of a plurality of open configurations and the closed configuration, said adjustment means comprising a threaded shank integral with said operative mechanism, a tubular stud internally threaded and threadedly engaged with said shank, said stud also being externally threaded, said external threads being coarser than said internal threads, a stroke adjuster nut threadedly received on said stud and keyed to said actuator body to prevent relative rotation therebetween about an actuating axis, said adjuster nut being movable along said actuating axis coincidental with the rotation of the stud about said actuating axis to a plurality of positions between and inclusive of a first position, relative to the terminal surface of said actuator body, wherein said operative mechanism is rendered inoperative and said dispensing means is in the closed configuration and a second position distant from said first position wherein said operative mechanism is operative to its greatest extent, thus enabling said dispensing means to open to its fully open position.

2. Dispensing apparatus as set forth in claim 1 wherein said adjustment means includes calibration means for setting in discrete incremental steps each of said plurality of open positions.

3. Dispensing apparatus as set forth in claim 1 including manual means for rotating said stud to thereby move said adjuster nut between said first and second positions.

4. Dispensing apparatus as set forth in claim 1 including manual means for rotating said stud in discrete incremental steps to thereby move said adjuster nut in similar discrete incremental steps between said first and second positions.

5. Dispensing apparatus as set forth in claim 4 wherein said manual means includes:

a crown member fixed to said stud, said crown member including an integral annular skirt overlying said actuator body and having a plurality of longitudinally extending grooves generally parallel to said actuating axis;

a spring biased detent ball mounted in said adjuster nut and successively engageable with each of said grooves;

whereby rotation of said crown member about said actuating axis results in a predetermined movement of said adjuster nut along said actuating axis.

6. Dispensing apparatus as set forth in claim 5 wherein said crown member is threadedly engaged with said stud; and including:

set screw means for fixedly joining said crown member to said stud.

7. Dispensing apparatus as set forth in claim 1 wherein said dispensing means includes:

a housing defining a reservoir for containing the fluid product under pressure;

valve means comprising a valve seat on said housing defining an outlet for dispensing the fluid product from said reservoir and a valve gate movable along said actuating axis between an open position away from the valve seat for dispensing said fluid product and a closed position in contact engagement with said valve seat for inhibiting or stopping the dispensing of the fluid product from said reservoir; and wherein said operative mechanism comprises a piston movable along said actuating axis between a first position at which said valve gate is closed and a second position at which said valve gate is open.

8. Dispensing apparatus as set forth in claim 7 wherein said adjustment means includes calibration means for setting in discrete incremental steps each of the plurality of open positions.

9. Dispensing apparatus as set forth in claim 8 wherein said calibration means includes:

a crown member fixed to said stud, said crown member including an integral annular skirt overlying said actuator body and having a plurality of longitudinally extending grooves generally parallel to said actuating axis; and a spring biased detent ball mounted in said adjuster nut and successively engageable with each of said grooves;

whereby rotation of said crown member about said actuating axis results in a predetermined movement of said adjuster nut along said actuating axis.

10. Dispensing apparatus as set forth in claim 7 wherein said housing further includes an inlet for delivery of pressurized fluid product to said reservoir.

11. Dispensing apparatus as set forth in claim 7 further including a valve stem, intermediate said piston and said valve gate, whose axis is coincident with said actuating axis and which is movable along said actuating axis for transferring the movement of said operative mechanism to said valve gate.

12. Dispensing apparatus as set forth in claim 11 wherein said valve gate is integral with said valve stem.

13. Dispensing apparatus as set forth in claim 11 wherein said valve gate is releaseably attached to said valve stem.

14. Dispensing apparatus as set forth in claim 11 wherein said valve stem is integral with said operative mechanism.

15. Dispensing apparatus as set forth in claim 11 wherein said operative mechanism includes an actuator shaft integral with said piston and intermediate said piston and said valve stem and releaseably attached to said valve stem in an end-to-end relationship.

16. Dispensing apparatus as set forth in claim 7 including a deformable diaphragm, for isolating said reservoir from said operative mechanism, extending transversely of said actuating axis and sealingly fixed at spaced regions to said housing and to said valve stem.

17. Dispensing apparatus as set forth in claim 11 wherein said valve stem extends through said outlet in said valve seat and through said reservoir.

18. Dispensing apparatus as set forth in claim 16 wherein said valve stem extends through said outlet in said valve seat and through said reservoir.

19. Dispensing apparatus as set forth in claim 11 wherein said adjustment means includes calibration means for setting in discrete incremental steps each of the plurality of open positions.

20. Dispensing apparatus as set forth in claim 19 wherein said calibration means includes:

a crown member fixed to said stud, said crown member including an integral annular skirt overlying said actuator body and having a plurality of longitudinally extending grooves generally parallel to said actuating axis; and a spring biased detent ball mounted in said adjuster nut and successively engageable with each of said grooves;

whereby rotation of said crown member about said actuating axis results in a predetermined movement of said adjuster nut along said actuating axis.

21. Dispensing apparatus as set forth in claim 16 wherein said adjustment means includes calibration means for setting in discrete incremental steps each of the plurality of open positions.

22. Dispensing apparatus as set forth in claim 21 wherein said calibration means includes:

a crown member fixed to said stud, said crown member including an integral annular skirt overlying said actuator body and having a plurality of longitudinally extending grooves generally parallel to said actuating axis; and a spring biased detent ball mounted in said adjuster nut and successively engageable with each of said grooves;

whereby rotation of said crown member about said actuating axis results in a predetermined movement of said adjuster nut along said actuating axis.

* * * * *